ered Sept. 13, 1955

2,717,842
ANTISTATIC TREATMENT AND TREATED PRODUCTS

Emil A. Vitalis, Springdale, Conn., assignor to American Cyanamid Company, New York, N. Y., a corporation of Maine No Drawing. Application September 10, 1952, Serial No. 308,915

12 Claims. (Cl. 117—138.8)

This invention relates broadly to antistatic treatments and to the products thereof. More particularly the invention relates to the method of conditioning a material or article which, in a dry state, normally tends to accumulate static charges of electricity thereon whereby this tendency is minimized or obviated, and to the treated materials or articles, for instance, textile materials in fiber, fabric or other form, sheet materials, e. g., those used in making photographic films, etc. Still more particularly the invention is concerned with a method which comprises applying to a base material or article of the aforementioned kind a liquid treating composition (specifically an aqueous solution or dispersion) comprising (1) an antistatic agent which is a soluble inorganic salt that normally is deposited in the form of relatively large crystals upon volatilization of the solvent in which it is dissolved, e. g., magnesium and strontium chlorides and nitrates, zinc chloride, etc., and (2) a crystal growth-inhibiting agent in an amount, with respect to the said antistatic agent, that is sufficient to inhibit the deposition of the said crystals. The amount of the aforesaid liquid treating or antistatic composition that is applied to the base material or article is such that the total amount of the ingredients of (1) and (2) held by the treated article is from about 0.2% to about 10% of the weight of the dried, untreated material. The aforesaid ingredients of (1) and (2) are dissolved or dispersed ("dispersed" being used generically hereinafter and in the appended claims to cover both solutions and dispersions) in a volatile liquid, e. g., water. The treated material or article is then dried to volatilize the aforesaid liquid.

It was suggested prior to my invention that antistatic compositions comprising an inorganic salt be used for treating textile materials that readily acquire and retain an electrostatic charge in order to impart antistatic characteristics thereto. For example, in Dreyfus Patent No. 2,086,544 it is suggested that various hygroscopic or deliquescent solids, more particularly electrolytes such as various organic and inorganic salts (among which the chlorides and nitrates of magnesium, calcium and zinc specifically are mentioned), be dissolved in an alcoholic medium e. g., methyl or ethyl alcohol or mixtures of water and an alcohol, and that the resulting solution be applied to staple fibers composed of or containing cellulose ester or ether filaments in order that the staple might be spun into yarn without difficulty due to the accumulation of electrostatic charges. It is further disclosed in this Dreyfus patent that the alcoholic solution of the electrolyte also may contain a lubricant, e. g., a fatty oil or a light or heavy mineral oil; and that, in conjunction with the application of the alcoholic solution, there also may be applied to the staple a softener or swelling agent which functions to increase the flexibility of the filaments, e. g., triacetin, the monomethyl and monoethyl ethers of ethylene glycol and the diethyl ether of diethylene glycol.

In Whitehead Patent No. 2,086,590 it is suggested that electrolytes, such as those disclosed in the aforementioned Dreyfus patent, be dissolved in a solvent of relatively high boiling point, e. g., ethylene glycol, diethylene glycol, glycerol and diacetone alcohol, and that the resulting solution be applied to, or incorporated in, staple fibers made of organic derivatives of cellulose, such as organic esters of cellulose and cellulose ethers, in order to reduce the tendency of such fibers to generate static electricity during the spinning operation. Also, in my Patents 2,562,154, −5, −6 and 2,567,159 I have disclosed and claimed wetting and detergent compositions containing a high monoalkyl sulfosuccinate and various water-soluble inorganic salts, among which magnesium nitrate and chloride specifically are mentioned, as a solubilizing agent for the aforementioned sulfosuccinate.

The present invention is based on my discoverey that antistatic compositions of the kind described briefly in the first paragraph of this specification possess an unobvious combination of properties which renders them eminently suitable for the treatment of a wide variety of textile materials, e. g., in the form of continuous-filament yarn, staple fiber, tow, roving, knitted, woven or felted fabrics, and which may be composed of or contain fibers or filaments of wool, silk, cellulose esters (e. g., cellulose acetate, cellulose acetobutyrate, cellulose formate, cellulose propionate, cellulose butyrate, etc.), cellulose ethers (e. g., ethyl cellulose, benzyl cellulose, etc.), viscose rayons, nylon, thermoplastic vinyl resins (e. g., vinyl chloride polymers and copolymers, acrylonitrile polymers and copolymers, etc.), and other natural and synthetic textiles in fiber, fabric or other form. For example, the preferred compositions employed in practicing this invention have both a softening and lubricating action on the textile and, in addition, have the ability to retard or obviate the accumulation of static charges of electricity on such textiles which normally tend to become charged with static electricity. This is a matter of considerable practical importance since both continuous-filament yarn and staple fibers are subjected to processes wherein softness and/or good lubricity are prime requisites. Furthermore, in many such processes the fibers, by reason of their constitution, develop and retain static charges of electricity that interfere with the processing operations.

The aforementioned and other difficulties are obviated by the use of the antistatic compositions herein involved and which provide static control with good static durability under low-humidity conditions or even in the complete absence of moisture. They also provide good static control at elevated temperatures. Furthermore, despite the fact that they contain a salt, more particularly a water-soluble inorganic salt (including those which normally form relatively large, sharp crystals upon volatilization of the solvent in which they are dissolved), the compositions appear to have no deleterious effect on textile equipment nor do they abrade, tear or shred the fiber during carding, drawing or other processing operations. Additionally, they can be applied to freshly spun fibers or filaments, including those which have been produced by a wet-spinning process and are still in a gel state (e. g., an aquagel or hydrogel state), without any apparent deleterious effect upon the structure of the fiber. These results were quite surprising and unexpected and in no way could have been predicted from the known properties of the components of the antistatic composition.

In the antistatic compositions employed in practicing the present invention the crystal growth-inhibiting component thereof coacts, at least during use of the composition, with the antistatic inorganic salt component thereof so as to modify, as to size, shape or hardness, any crystal or crystals of the said inorganic salt that normally might tend to form or be deposited upon volatilization of the solvent in which the salt is dissolved; or, in some cases, so as to prevent crystal formation or deposition completely. The latter represents the optimum condition to be attained and is generally secured when the preferred inorganic salts (examples of which have been given in the first paragraph and others of which will be given hereinafter) are employed in the optimum weight ratios with the crystal growth-inhibiting modifier. Under less favorable conditions, the normal tendency of the antistatic inorganic salt to form relatively large crystals, and which also may be relatively hard and/or sharp, or abrasive, can be modified or controlled so that crystals having a maximum average particle size of about 5 microns are present in the composition. Such sizes are near the lower limit of the resolving power of light microscopes. Such small crystals are relatively soft (substantially non-abrasive) and appear to have no harmful effect upon textile equipment or upon the fiber that is being processed.

The preferred crystal growth-inhibiting agent that is a component of the antistatic compositions herein involved is a salt (bisulfite-addition product) of the kind disclosed and claimed in the copending application of Joseph J. Carnes and Richard K. Madison, Serial No. 308,940, filed concurrently herewith and now Patent No. 2,698,856. Antistatic compositions comprising such a bisulfite-addition product and an antistatic inorganic salt are more fully described and are broadly and specifically claimed in my copending application Serial No. 308,916, also filed concurrently herewith, and these are the preferred antistatic compositions that are employed in carrying the present invention into effect. In such compositions, as well as in others hereinafter described, the organic modifier has a softening and lubricating effect upon the textile or other material being treated, and itself is able to impart some antistatic properties to the material.

Of the aforementioned bisulfite-addition products, the preferred class is composed of those which are represented by the following general formula:

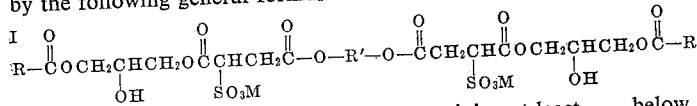

where R represents an aliphatic radical containing at least 7 carbon atoms, R' represents a divalent aliphatic or other organic radical containing at least 2 carbon atoms, more particularly (a) an alkylene radical containing at least 2 carbon atoms, e. g., ethylene, propylene, butylene, pentylene, hexylene, heptylene, octylene, nonylene to octadecylene, inclusive, or (b) a polyoxyalkylene radical, more particularly such a radical represented by the general formula II     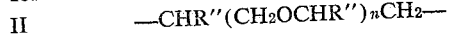

where R'' represents hydrogen or a methyl radical and $n$ represents a number between 1 and about 135, and M is a salt-forming cation.

Examples of salt-forming cations represented by M in the above formula are any of the alkali metals, ammonium, polyvalent metals (e. g., barium, strontium, calcium, magnesium, etc.) or those derived from organic bases such, for instance, as methyl, ethyl, propyl and butyl amines, dimethyl, diethyl, dipropyl and dibutyl amines, mono-, di- and triethanol amines, as well as other higher aliphatic and hydroxy-aliphatic amines, guanylurea, guanidine, hydroxyethylguanidine, biguanide, aryl amines, e. g., aniline, etc., aralkyl amines, e. g., benzyl amine, etc., alkaryl amines, e. g., toluidine, etc., and heterocyclic bases, e. g., nicotine, pyridine, quinoline, alkaloids, etc.

Illustrative examples of aliphatic radicals represented by R in Formula I are heptyl, octyl, octenyl, nonyl, decyl, decenyl, undecyl, undecenyl, tridecyl, pentadecyl, heptadecyl, heptadecenyl, nonadecyl, heneicosyl, heneicosenyl, tricosyl, etc.

The reactions involved in the preparation of the bisulfite-addition products that are used in producing the preferred antistatic compositions employed in practicing the present invention are (A) esterification, (B) condensation and (C) sulfonation at the double bonds of the condensation product of (B) with a bisulfite, more particularly a water-soluble bisulfite. Equations for these reactions are given in the aforementioned Carnes et al. copending application Serial No. 308,940 and wherein ethylene glycol is taken as illustrative of the aliphatic dihydroxy compound, maleic anhydride as illustrative of the ethylenically unsaturated dicarboxylic compound, a fatty acid monoglyceride as illustrative of the glycerol ester and sodium bisulfite as illustrative of the bisulfite.

In forming these bisulfite-addition products, one can use maleic anhydride or other ethylenically unsaturated dicarboxylic acid or available anhydrides thereof, and wherein the ethylenically unsaturated group is alpha to a carbonyl group, for instance fumaric, citraconic, itaconic or mesaconic acids or their available anhylrides. The preferred dicarboxylic compound is maleic anhydride, although maleic acid or fumaric acid likewise can be employed to produce a product containing sulfosuccinic groupings.

Instead of using ethylene glycol as the aliphatic dihydroxy compound in forming the bisulfite-addition product, one can use other simple alkylene glycols, e. g., propylene, butylene, pentylene, heptylene, hexylene, octylene, nonylene to octadecylene (and higher) glycols and wherein the alkylene grouping is either straight or branched chain; the polyoxyalkylene glycols, or polyalkylene glycols as they are pehhaps more commonly designated, e. g., diethylene glycol, triethylene glycol, dipropylene glycol, tripropylene glycol and the higher polymers of the lower alkylene glycols; as well as others. The polymers of the lower alkylene glycols are available in a variety of average molecular weights ranging from approximately 200 up to 6000 and higher. Some of the more generally available of these polymeric lower-alkylene glycols are listed below with their commercial designations, together with their average molecular weights:

| Polyalkylene Glycol | Average Molecular Weight |
| --- | --- |
| Polyethylene glycol 200 | 190–210 |
| Polyethylene glycol 300 | 285–315 |
| Polyethylene glycol 400 | 380–420 |
| Polyethylene glycol 600 | 570–630 |
| Polypropylene glycol 150 | 140–160 |
| Polypropylene glycol 425 | 400–450 |
| Polypropylene glycol 750 | 700–800 |
| Polypropylene glycol 1025 | 975–1,075 |
| Polypropylene glycol 1200 | 1,150–1,250 |
| Polypropylene glycol 2025 | 1,950–2,100 |
| "Carbowax" compound 1000 | 950–1,050 |
| "Carbowas" compound 1540 | 1,300–1,600 |
| "Carbowax" compound 4000 | 3,000–3,700 |
| "Carbowax" compound 6000 | 6,000–7,500 |

The above "Carbowax" compounds are wax-like polyethylene glycols having the aforementioned average molecular weights. These polyalkylene (polyoxyalkylene) glycols contain residues or radicals which can be expressed by the general formula hereinbefore given with reference to Formula I. When $n$ in that formula represents about 135, a typical example of a polyoxyalkylene glycol employed to get the final product represented by Formula I would be "Carbowax" compound 6000. Unlike other "Carbowax" compounds, "Carbowax" compound 1500 is a blend of about equal parts of polyethylene glycol 300 and "Carbowax" 1540, and has an average molecular weight of from 500 to 600.

As the glycerol ester which is caused to react with the esterification product of the aliphatic dihydroxy compound (e. g., an alkane diol) and the ethylenically unsaturated dicarboxylic compound, it is preferred to use a monoglyceride of a fatty acid containing at least 8 carbon atoms (particularly those having from 12 to 18 carbon atoms, inclusive). Examples of such glycerol esters are the monoglycerides of caprylic, capric, lauric, myristic, palmitic, stearic, arachidic, behenic, carnaubic, cerotic, montanic and mellisic acids; and oleic, elaidic, isooleic, rapic, erucic, brassidic, and other unsaturated fatty acids. Such acids are obtainable from and include those derived from vegetable and animal oils and fats, for instance those derived from soya bean oil, cottonseed oil, coconut oil, linseed oil, castor oil, dehydrated castor oil and the like, or from other commercial sources such as talloil. One can also use the diglycerides of a fatty acid (or mixtures of fatty acids) of the kind aforementioned, as well as a mixture of a fatty acid monoglyceride and diglyceride in any proportions.

The condensation reaction between the glycerol ester and the esterification product of the aliphatic dihydroxy compound and the ethylenically unsaturated dicarboxylic compound is preferably continued until at least the theoretical quantity of the water of reaction has been removed.

The sulfonation reaction between the aforementioned condensation product (polyester) and a bisulfite is carried out in accordance with conventional procedure. The bisulfite or meta-bisulfite or mixture thereof in any proportions is preferably employed in a molar ratio corresponding to about 2 moles thereof, or somewhat higher, e. g., up to 3 moles thereof, per mole of the linear polyester condensation product so that one sulfo group is added at each of the two double bonds in the said polyester. If it be desired to add only one sulfo group at one of the double bonds of the polyester, as sometimes may be the case, then as little as 1 mole (or slightly thereabove) of the bisulfite can be employed for each mole of the linear polyester.

From the foregoing it will be seen that M in Formula I is obtained by substantially complete sulfonation of the ethylenically unsaturated polyester with a bisulfite or meta-bisulfite or a mixture thereof, which bisulfite or meta-bisulfite contains a cationic salt-forming substituent of which numerous examples have been given hereinbefore. Preferably the sulfonation is carried out by heating the polyester in a solution of a soluble bisulfite of an organic or inorganic base dissolved in water or a mixture of water and an organic solvent which is miscible therewith, e. g., ethanol. Heating is continued until the desired degree of sulfonation has taken place and the salt corresponding to the bisulfite (including meta-bisulfite) employed has been directly produced.

In addition to the alkali-metal, ammonium and amine salts that readily can be produced by direct sulfonation of the unsaturated polyester with a bisulfite, salts of other bases may be prepared by first acidifying, with a mineral or other strong acid (e. g., HCl), an alcoholic solution of the alkali-metal, ammonium or amine salt, whereby the free polyester of the substituted or unsubstituted aliphatic sulfodicarboxylic acid is obtained, filtering off the inorganic or other salt of the acid used, and reacting the acid polyester with the desired base. Salts of the polyvalent metals, such for instance, as calcium, barium, lead, cadmium and the like may be prepared, if desired, by adding a stoichiometric quantity of an oxide or hydroxide thereof to an alcoholic solution of the acid polyester, followed by stirring until salt formation has been obtained.

The bisulfite-addition products used in producing the preferred antistatic compositions employed in practicing the present invention are preferably those which are readily soluble or dispersible in water. They can be economically produced from commercially available raw material, and can be easily prepared in a wide range of commercially useful forms (e. g., from viscous liquids to hard, waxy solids) and with solubility and other characteristics which will best meet the special requirements of an antistatic composition for a particular service application.

Various other crystal growth-inhibiting substances may be employed as a modifier of the antistatic inorganic salt in producing the antistatic compositions used in practicing the present invention. The preferred crystal growth-inhibiting substances are those which not only function as such but which also are able to impart softness and lubricity to the material which is being treated, e. g., a textile formed of natural or synthetic fibers that normally, when dry, accumulates electrostatic charges. Examples of such substances, in addition to the aforedescribed bisulfite-addition products, are certain quaternary ammonium compounds, e. g., those represented by the general formula

III

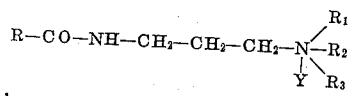

wherein R is a member of the group consisting of aliphatic and alicyclic radicals containing at least 7 carbon atoms, $R_1$ and $R_2$ are members of the group consisting of alkyl and hydroxyalkyl radicals of from 1 to 3 carbon atoms, inclusive, $R_3$ is a hydroxy-alkyl radical of from 1 to 3 carbon atoms, inclusive, and Y is an anion. Examples of such compounds are gamma-stearamidopropyl dimethyl beta-hydroxyethyl ammonium chloride and phosphate. Other examples will be found in Cook et al. Patent No. 2,589,674 and wherein they are broadly and specifically claimed per se.

Illustrative examples of other crystal growth-inhibiting substances which have properties similar to compounds of the kind embraced by Formula III, and which may be used in the antistatic compositions employed in practicing the present invention, are quaternary ammonium compounds represented by the general formula

IV

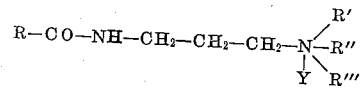

wherein R represents an aliphatic hydrocarbon radical containing at least 7 carbon atoms, R' and R" each represents an alkyl radical containing from 1 to 5 carbon atoms, inclusive, R''' represents a radical of the group consisting of alkyl, alkenyl and aralkyl radicals, and Y represents an anion. Examples of such compounds are gamma-stearamidopropyl dimethyl benzyl ammonium chloride and phosphate. Other examples are given in the copending application of Joseph J. Carnes, Serial No. 242,434, filed August 17, 1951, now Patent No. 2,626,877, dated January 27, 1953.

Another class of substances the individual members of which are effective crystal growth-inhibiting agents and which also are able to impart softness and lubricity to the material which is being treated are polyesters of sulfosuccinic acid with a substantially equimolecular quantity of a monoglyceride of a fatty acid, or a mixture of fatty acids, having from 12 to 18 carbon atoms, inclusive, e. g., cottonseed acid monoglyceride, hydrogenated tallow acid monoglyceride, coconut acid monoglyceride and glyceryl monostearate, which polyester has at least two ester units per molecules. Other examples and information concerning the preparation of these polyesters, which are polymeric materials, and also with regard to their properties, will be found in the copending application of Jack T. Thurston, Serial No. 188,485, filed October 4, 1950, now Patent No. 2,637,663, dated May 5, 1953.

Various substances are able to inhibit crystal growth of the antistatic inorganic salt and are operative in the antistatic compositions used in practicing the present invention but have no appreciable, if any, softening and/or lubricating effect upon the material or article being treated. Among such substances may be mentioned symmetrical bis(sodium sulfonaphthyl)methane which is available under the trade name Tanak A; the diamyl and dihexyl sodium sulfosuccinates; and compounds of the general formula R—Ar—SO$_3$M, where R represents an alkyl group having from 9 to 16 carbon atoms, inclusive, and which is derived from a petroleum hydrocarbon distillate boiling in the range of from 150° to 300° C., Ar represents a divalent aromatic hydrocarbon radical of the benzene series, and M represents a salt-forming cation of the kind mentioned hereinbefore with reference to Formula I, specifically sodium. These last-named compounds in the form of their sodium salts are now commonly known as sodium kerylbenzene sulfonates.

The antistatic compositions used in practicing the present invention are produced by mixing together, in any suitable manner, ingredients of the kind described briefly in the first paragraph of this specification and more fully elsewhere herein. For example, a composition containing 25% by weight of solids and which is dilutable with water to 0.2 to 20% by weight of solids for use as herein described can be prepared as follows:

|  | Parts |
|---|---|
| Crystal growth-inhibiting agent, e. g., a bisulfite-addition product of the kind disclosed and claimed in the aforementioned Carnes et al. copending application Serial No. 308,940 | 106.9 |
| Antistatic inorganic salt, e. g., Mg(NO₃)₂.6H₂O | 288.1 |
| Water | 605.0 |
| Total | 1000.0 |

The water (advantageously water that has been subjected to an ion-exchange treatment) is introduced into a suitable reaction vessel and heated therein, for instance to a temperature of 155°–165° F. The bisulfite-addition product or other crystal growth-inhibiting agent is then added, and the mixture is stirred until the aforesaid ingredient has been substantially completely dissolved or uniformly dispersed, e. g., for from ½ to 3 hours or longer. If desired or required, one may then add a suitable antifoam agent, e. g., from about 0.00005 to 0.001 part of silicon oil (antifoaming type, e. g., Dow-Corning "Antifoam A") dissolved in a suitable solvent, for instance a mixture of benzene and isopropanol in a 70–30 volume ratio. The antistatic inorganic salt, e. g., Mg(NO₃)₂.6H₂O, is then added slowly while agitating the mixture, for instance over a period of from ½ to 1 or 2 hours. The pH may then be, for example, from about 2.8 to about 3.2, or lower or higher, depending upon the particular ingredients employed. The pH is then preferably adjusted to about 5.4 to 5.8, if lower than about 5.4, by adding a suitable basic material, e. g., morpholine, in an amount sufficient to bring the mass within this pH range. The resulting product is then mixed with water to provide a treating composition of the desired solids content for use in carrying the present invention into effect.

Reference also is made to my aforementioned copending application Serial No. 308,916 for a more detailed illustrative description of the preparation of the antistatic composition when the preferred crystal growth-inhibiting agent is a component thereof.

For convenience and economy in handling and shipping, the antistatic substances used in practicing the present invention may be prepared in the form of pastes or paste-like materials which are dilutable with water to form substantially homogeneous antistatic compositions and which comprise the ingredients described in the first paragraph, that is, an antistatic inorganic salt (1) and a crystal growth-inhibiting agent (2). The solid ingredients of (1) and (2) usually are present in the antistatic composition in weight percentages of from about 5 to 97% of the former to from about 95 to 3% of the latter. The aforementioned ingredients of (1) and (2) and water are preferably present in such paste-like materials in weight percentages of from about 20% to about 65% of the said ingredients of (1) and (2) to from about 80% to about 35% of water. Typical formulations in the preparation of 25% pastes and 60% pastes are given below by way of illustration and wherein the percentages are by weight:

25% paste

|  | Minimum, Percent | Maximum, Percent | Average, Percent |
|---|---|---|---|
| Crystal growth-inhibiting agent | 1.20 | 23.00 | 8.33 |
| Antistatic inorganic salt, preferably magnesium nitrate | 23.80 | 2.00 | 16.67 |
| Water | 75.00 | 75.00 | 75.00 |
| Total | 100.00 | 100.00 | 100.00 |

60% paste

|  | Minimum, Percent | Maximum, Percent | Average, Percent |
|---|---|---|---|
| Crystal growth-inhibiting agent | 2.88 | 55.20 | 20.00 |
| Antistatic inorganic salt, preferably magnesium nitrate | 57.12 | 4.80 | 40.00 |
| Water | 40.00 | 40.00 | 40.00 |
| Total | 100.00 | 100.00 | 100.00 |

In the above formulations the preferred crystal growth-inhibiting agent is a bisulfite-addition product of the kind disclosed and claimed in the aforementioned Carnes et al. copending application Serial No. 308,940, more particularly one obtained by addition of a bisulfite to each of the two ethylenically unsaturated bonds of a polyester which is a condensation product of (A) a glyceryl ester comprising glyceryl monostearate and (B) polyethylene glycol dimaleate comprising mainly nonaethylene glycol dimaleate.

In using the antistatic compositions involved herein, a solution or a dispersion of the composition is applied by any suitable means to the article which, in a dry state, normally has a tendency to accumulate static charges of electricity, followed by drying of the treated article to volatilize the solvent or liquid component. The treatment is applicable to such articles in various forms, for instance in the form of filaments, fibers, yarns, films, woven, knitted and felted fabrics, etc. These antistatic compositions are particularly useful as antistatic finishes for fibers or fabrics composed of or comprising substantial proportions of silk, nylon, wool, viscose rayons, cellulose acetate or other cellulose ester rayons, vinyl resins, including homopolymeric and copolymeric acrylonitrile and other thermoplastic vinyl resins.

As is well known to those skilled in the art, the vinyl resins constitute a class of materials which develop or tend to develop an electrostatic charge upon their surfaces when fibers or other articles made therefrom are subjected to friction during their production and during processing or fabrication of the fibers into fabric or other articles, as well as during the use of the finished article. The antistatic compositions involved herein have been found to be particularly adapted for use in conditioning filaments, fibers, yarns, films and other shaped articles composed of or containing a vinyl resin so as to obviate or minimize their tendency to accumulate static charges of electricity. Examples of vinyl resins, more particularly thermoplastic vinyl resins, which can have antistatic characteristics imparted thereto by means of the compositions herein described are polyacrylonitrile, copolymers of acrylonitrile and a different vinyl compound such, for instance, as vinyl chloride, copolymers of vinyl acetate and vinyl chloride, etc. Other examples of vinyl resins to which these antistatic compositions advantageously can be applied are given in, for example, Cresswell Patent No. 2,597,708 dated May 20, 1952, e. g., in column 3, lines 41–75, and column 4, lines 1–51. The preferred vinyl resins that are subjected to treatment with the antistatic compositions herein involved are acrylonitrile polymerization products, especially those which contain a substantial amount, more particularly a preponderant proportion, by weight of combined acrylonitrile.

Antistatic compositions used in practicing the present invention may be applied under various pH conditions, as desired or as conditions may require. They may be applied in the cold, warm or at the boil, and are chemically stable to aging. They may be used alone or with other additives or modifiers, e. g., mono-, di- and triethanolamines, lanolin, morpholine, disodium phosphates, dialkyl phosphates, alkyl esters of long-chain fatty acids, e. g., the ethyl to amyl, inclusive, esters of fatty acids containing from 12 to 18 carbon atoms, inclusive, conventional wetting and/or dispersing agents, silicone oils, mineral, vegetable and animal oils, etc. The liquid compositions can be applied advantageously in many cases at a pH of about 6.0 to 7.0, e. g., to articles formed of a polymer of acrylonitrile or other vinyl resin.

The antistatic compositions with the use of which this invention is concerned not only are capable of imparting antistatic characteristics to vinyl resins (including thermoplastic vinyl resins) and other articles which normally, when dry, have a tendency to accumulate electrostatic charges, but in general they are also able to effect this result without detrimentally affecting the color, tensile strength, elasticity, chemical resistance, bacterial and fungal resistance, and other valuable properties of the vinyl resin; in other words, without rendering the vinyl resin article (or other material that is treated) in any way unsuited for its intended purpose. As a matter of fact, and as has been mentioned hereinbefore, the preferred antistatic compositions also beneficially affect the article by imparting softness and lubricity thereto.

The antistatic compositions herein involved are preferably applied to the article to be treated in the form of a liquid dispersion, more particularly an aqueous dispersion. This dispersion may contain any suitable amount of the antistatic composition, but ordinarily the antistatic inorganic salt and crystal growth-inhibiting agent are present in the dispersion in an amount corresponding to from about 0.2% to about 20% by weight thereof of the aforesaid ingredients. The dispersion may be applied, for example, by immersing the fiber (or other shaped article formed of vinyl resin or other material) in the dispersion, or by spraying, padding, brushing or otherwise contacting the article with the dispersion. The dispersion may be applied at temperatures ranging from room temperature (20°–30° C.) up to the boiling temperature of the dispersion, e. g., about 100° C., as desired or as conditions may require. Upon drying the fiber or other shaped article at room temperature or at an elevated temperature, e. g., or heated drying rolls, in ovens, tunnel driers, etc., the treated article has the solid antistatic composition deposited at least on the outer surfaces thereof. The amount of antistatic composition which is present in or on the dried, treated material or article may vary considerably, but ordinarily it is present therein or thereon in an amount, by weight, corresponding to from about 0.2% to about 10% of the dried, untreated article.

The finishing compositions employed in practicing this invention advantageously may be applied to fibers of polyacrylonitrile and other vinyl resins, as well as to other articles, in percentages by weight, based on total solids applied to the article, as follows:

| | Minimum, Percent | Maximum, Percent | Average, Percent |
|---|---|---|---|
| Crystal growth-inhibiting agent, specifically the preferred bisulfite-addition product | 0.05 | 5.0 | 0.5 |
| Antistatic inorganic salt, preferably magnesium nitrate | 0.25 | 3.0 | 1.0 |

In general, no particular advantage appears to accrue when the percentage by weight of the antistatic inorganic salt exceeds more than about 3% of the weight of the dry, untreated continuous-filament yarn, staple fiber or other article to which it is applied in order to impart antistatic characteristics thereto. Obviously, the use of higher amounts of the inorganic salt which is applied (in combination with the crystal growth-inhibiting agent, e. g., a bisulfite-addition product) to the untreated article is not precluded.

The antistatic compositions herein involved may be applied to, for instance, a shaped thermoplastic vinyl resin, for example, yarns of associated filaments of such a resin, in the course of the production of the yarn or other shaped article, or subsequent to the production of the yarn and before or after any textile operations in which such yarns are used, especially those operations which include or involve a winding operation. By applying the antistatic composition in the course of producing the filaments or fibers, the application may suffice for subsequent textile operations. If desired, however, the textile-treating agent comprising the antistatic composition may be applied both during the process of producing the yarns as well as later when these yarns are fabricated into textile fabrics.

The antistatic composition also may be applied to, for instance, thermoplastic vinyl resins or other articles when the latter are in gelled form. For example, I may apply a liquid-treating agent containing the antistatic composition to a fiber in gel state, more particularly an aquagel state, and in which the solid phase comprises, for example, an acrylonitrile polymerization product, more particularly such a product which contains in the molecules thereof an average of at least about 80% by weight of combined acrylonitrile. Thereafter the thusly treated, gelled fiber is dried, for example by continuously passing the fiber over heated drying rolls as is described more fully in, for instance, Cresswell et al. Patent No. 2,558,733 dated July 3, 1951. In this way the applied composition imparts antistatic characteristics to the fiber both during and after drying thereof.

The antistatic compositions herein involved are especially suitable for use in the treatment of water-swollen, oriented or unoriented fibers, films, etc., which have been produced as described in, for example, Cresswell Patents 2,558,730 and 2,558,731 dated July 3, 1951, and in the aforementioned Cresswell et al. Patent No. 2,558,733; also, in the treatment of the dried products, whereby the tendency of the dried material to accumulate static charges of electricity is obviated or minimized and a treated material which, in general, is softer to the touch is obtained.

As has been mentioned hereinbefore, any suitable method may be employed in applying the antistatic composition to the vinyl resin or other base material in fiber, film or other form, and it may be applied at any suitable stage of the production of the shaped article, or during its fabrication into other forms, or to the finished, fabricated article and prior to or during its service use. For example, if the conditioning agent comprising the antistatic composition is to be applied to the yarn after spinning, the yarn may be brought into contact with a wick, roll or felt which has been wetted with a solution or dispersion containing the antistatic agent dissolved or dispersed in water, ethanol (or other alcohol), a water-ethanol mixture, or other liquid solvent or dispersion media. Alternatively, liquid antistatic composition may be applied by immersing the article in a bath containing the same. Examples of points during the production of a yarn at which the antistatic composition may be applied are during stretching of a wet-spun yarn or fiber to orient the molecules thereof, or between any of the guides or godets or other rolls employed in the spinning process, or between the guide and the point of winding and/or twisting; or, the antistatic composition may be applied after winding onto cones, spools, bobbins or the like; or, in the case of staple fiber manufacture either prior to or after cutting the tow into staple lengths.

For example, a tow of filaments that is to be cut into staple fibers may be treated with a dispersion of the antistatic composition prior to cutting. Alternatively, staple fibers such as those which may occur naturally or those cut from continuous lengths of natural or artificial filaments, may be treated with a dispersion of the antistatic composition, e. g., by spraying while the fibers are being moved on a continuous conveyor beneath the spray, followed by drying the treated fibers. Or, the treatment may be applied during an intermediate stage of the spinning operations, e. g., immediately after lapping, carding, drawing or slubbing; or, the antistatic composition may be applied during fiber-mixing, or -blending operations. The staple lengths may range, for example, from ½ inch to 8 inches or more and in deniers ranging, for instance, from 1 to 30 deniers or more. The short lengths of dried, treated filaments or threads are then subjected to a suitable spinning operation by any of the conventional systems, e. g., the "cotton," the "worsted," the "wool," the "spun silk," etc.

If desired, the antistatic composition which is deposited in or on the treated article may be allowed to remain in place during and after the production of the article in its ultimate form. The antistatic substance may be removed, as desired or as conditions may require, from yarns, fabrics and the like containing the same by means of the usual aqueous scouring baths. The treated fibers or fabrics can be dyed, if desired, without scouring off the antistatic finish prior to dyeing.

The preferring vinyl resin which is subjected to treatment as herein described is polymeric acrylonitrile or thermoplastic copolymeric acrylonitrile containing in its molecules a substantial amount of combined acrylonitrile. Of such copolymeric acrylonitriles, it is preferred to treat an acrylonitrile copolymer containing in the polymer molecules an average of at least about 80% by weight of combined acrylonitrile, e. g., from about 85% to about 99.5% by weight of combined acrylonitrile. In such copolymeric products, the proportions of monomers in the polymerizable mixture from which the copolymers are made are preferably adjusted so that the final copolymer contains in the molecules thereof an average of at least about 80% by weight of acrylonitrile (combined acrylonitrole). Hence, the expression "acrylonitrile polymerization product containing in the molecules thereof at least about 80% by weight of combined acrylonitrile" means a polymerization product (polymer, copolymer or interpolymer or mixture thereof) containing in its molecules an average of at least about 80% by weight of the acrylonitrile unit, which is considered to be present in the individual polymer molecule as the group

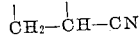

or, otherwise stated, at least about 80% by weight of the reactant substance converted into and forming the polymerization product is acrylonitrile (combined acrylonitrile).

The use of antistatic compositions of the kind with which this invention is concerned in the treatment of, for example, wool, nylon, silk, viscose and acetate rayons, vinyl resins, etc., to obviate or lessen the tendency of such materials to accumulate charges of electricity thereon has numerous advantages, among which may be mentioned their ease of application (e. g., as aqueous dispersions, at any pH, in the cold, or warm, or at the boil); the fact that they are chemically stable to aging; the fact that they do not form insoluble compounds or bodies in dispersions thereof in hard water; their effectiveness both as antistatic agents and in lubricating and softening the shaped article in yarn or other form, whereby the treated yarn, film or other article is rendered more amenable to further processing or fabricating (e. g., weaving, knitting, etc., in the case of yarns); the fact that, even though they contain an antistatic inorganic salt which normally might tend to deposite large, sharp crystals having an abrasive effect upon the treated article, the composition does not physically damage or have any other deleterious effect upon the fiber, fabric or other article to which it has been applied; their compatibility with other conditioning agents commonly employed in finishing compositions used in treating fibers and other shaped articles; their ease of removal from the treated article, when such removal appears to be desirable for subsequent processing or use of the article; their non-harmful effect upon the vinyl resin or other material which is subjected to treatment; as well as other advantages.

The term "yarn" as used generically herein includes within its meaning a single filament, a plurality of filaments associated into the form of a thread and which may be of any desired twist, single or multiple threads associated or twisted together, as well as staple fibers produced from filaments or threads and spun yarn produced from such staple fibers. The term "fiber" as used generically herein includes both monofilaments and multifilaments.

In order that those skilled in the art may better understand how the present invention can be carried into effect, the following examples are given by way of illustration and not by way of limitation. All parts and percentages are by weight.

EXAMPLE 1

This example illustrates the use of the sodium bisulfite-addition product of the condensation product of glyceryl monostearate and polypropylene glycol 1200 dimaleate in an antistatic composition which contains magnesium nitrate as an antistatic inorganic salt. This bisulfite-addition product can be prepared, for example, as follows:

A. *Preparation of the dimaleate ester of polypropylene glycol 1200*

Maleic anhydride, 65.5 g. (0.67 mole), and polypropylene glycol 1200, 400 g. (0.33 mole), are placed in a one-liter, three-neck flask fitted with a condenser, stirrer, thermometer, and nitrogen-inlet tube. The temperature is raised to 135–140° C. and maintained there for one hour. The product, a pale yellow, viscous liquid, has an acid number of 78.7 (calc'd 80.3).

B. *Condensation of the dimaleate ester of polypropylene glycol 1200 and glyceryl monostearate*

Polypropylene glycol 1200 dimaleate, 465.5 g. (0.327 mole, based on acid number), glyceryl monostearate, 228 g. (0.655 mole), and 75 ml. xylene are placed in a two-liter, three-neck flask fitted with a water trap, condenser, stirrer, thermometer, and nitrogen-inlet tube. The temperature is raised to 195–200° C. and maintained there for 5½ hours. At the end of this period 10.5 ml. (89%) of water of reaction has been collected. The xylene is removed by distillation under reduced pressure. The product, a pale tan, waxy solid, has an acid number of 7.7.

C. *Sulfonation of the condensation product of polypropylene glycol 1200 dimaleate and glyceryl monostearate*

The product prepared in B, 702 g., Na$_2$SO$_3$, 13.1 g. (0.104 mole), denatured ethanol, 788 g., and water, 200 g., are placed in a three-liter, three-neck flask fitted with a condenser and stirrer. Heating is by means of steam bath. After 15 minutes' refluxing, Na$_2$S$_2$O$_5$, 57.0 g. (0.300 mole), is added. The mixture is maintained at reflux for 22 hours. At the end of this period the sulfonation is 100% complete. The excess bisulfite is oxidized to bisulfate with hydrogen peroxide. The pH is raised to 6.0–6.5 by the addition of sodium hydroxide solution. The mixture is stripped to 90% solids. The product is a tan, waxy solid.

A liquid antistatic composition containing 1.5% of solids is prepared as follows:

To 588 parts of water at 120° F. is added 3 parts of the bisulfite-addition product of C. The mixture is stirred until the solid is completely dispersed, after which 10.4 parts of Mg(NO$_3$)$_2$.6H$_2$O is added and stirring is continued until a substantially uniform dispersion has been produced.

Thirty (30) parts of dry, staple synthetic fiber (3 denier, 4½ inches average length), more particularly a fiber formed of a copolymer of about 95% acrylonitrile and 5% methyl acrylate, is immersed in this dispersion. After 10 minutes' immersion in the 120° F. dispersion, the staple is hydroextracted to contain a weight of solvent which is about equal to the weight of the dry staple. It is then dried for 2 hours at 150° F.

When the dried, treated staple is pulled through combs or stroked with metal, glass or plastic combs, there is no evidence of the accumulation of static charges of electricity on the staple. The treated staple is heated for an additional 2 hours at 200° F. When similarly tested by combing or stroke tests immediately after removal from the oven or after conditioning for 24 hours at 25° C., 50% R. H., there is still no evidence of electrostatic charges on the staple. Furthermore, even after 2 months' storage of the treated staple, there is no loss in its antistatic characteristics.

When the untreated staple is subjected to these same stroking and combing tests, it develops a high electrostatic charge and cannot be processed satisfactorily on textile equipment.

EXAMPLE 2

This example illustrates the use of the sodium bisulfite-addition product of the condensation product of glyceryl monostearate and polyethylene glycol 400 dimaleate in an antistatic composition which contains amgnesium nitrate as an antistatic inorganic salt. This bisulfite-addition product can be prepared in accordance with the same general procedure given under Example 1 with reference to the preparation of a different bisulfite-addition product. For additional details see some of the examples in the aforementioned Carnes et al. copending application Serial No. 308,940, for instance Example 5.

A liquid antistatic composition containing 3% solids is prepared as follows: 12 parts of the above-described bisulfite-addition product is added to 578 parts of water at 120° F., and the mixture is stirred until a substantially uniform dispersion has been obtained. Ten and four-tenths (10.4) parts of $Mg(NO_3)_2.6H_2O$ is now added, and stirring is continued until the composition is substantially uniform.

A swatch (10 parts) of fabric, square weave (40 x 46), that had been woven from staple fiber of a copolymer of acrylonitrile of the kind described more particularly in Example 1, is immersed in the 120° F. liquid antistatic composition for 1 minute, and is then passed through a pad-mangle adjusted to 100% wet-pickup. The treated fabric is dried for 5 minutes at 250° F. No static effect is observed when dried, treated fabric is hand-stroked with a glass, metal or plastic rod. In marked contrast the untreated fabric, when similarly stroked, shows considerable accumulation of electrostatic charges.

EXAMPLE 3

This example illustrates the use of the sodium bisulfite-addition product of the condensation product of glyceryl monostearate and polyethylene glycol 600 dimaleate in an antistatic composition which contains magnesium nitrate as the antistatic inorganic salt. This bisulfite-addition product can be prepared in accordance with the same general procedure given under Example 1 with reference to the preparation of a different bisulfite-addition product. For additional details see some of the examples in the aforementioned Carnes et al. copending application Serial No. 308,940, for instance Example 6.

A liquid antistatic composition containing 2% solids is prepared as follows: 6 parts of the above-described bisulfite-addition product is added to 584 parts of water heated to 120° F. The mixture is stirred until the solid is completely dispersed, after which 10.4 parts of $$Mg(NO_3)_2.6H_2O$$

is added and stirring is continued until a substantially uniform dispersion has been produced.

A swatch (20 parts) of fabric formed of Vinyon N (a copolymer of about 60% vinyl chloride and about 40% acrylonitrile) is immersed in the 120° F. liquid antistatic composition for 1 minute, and is then passed through a pad-mangle adjusted to 100% wet-pickup. The treated fabric is dried at 110° F. for 1 hour. No static effect occurs when the dried, treated fabric is hand-stroked with a glass, metal or plastic rod. In marked contrast the untreated fabric accumulates static charges of electricity when similarly stroked or by merely waving it in the air.

EXAMPLE 4

Example 3 is repeated, but substituting a swatch of nylon fabric for the swatch of Vinyon N fabric. The dried, treated nylon fabric accumulates no observable charge of static electricity when hand-stroked as described in Example 3, whereas the untreated fabric accumulates electrostatic charges upon hand-stroking with a glass, metal or plastic rod.

EXAMPLE 5

This example illustrates the treatment of Dacron fibers. Dacron is a trade name for fibers formed of polymeric ethylene glycol terephthalate. It is a polyester condensation polymer.

Thirty (30) parts of dry Dacron staple (3 denier, 2½ inches in average length) is immersed in a liqiuid antistatic composition containing 2% of solids and which is prepared as follows:

To 588 parts of water at 120° F. is added 3 parts of the same sodium bisulfite-addition product described in Example 2, and the mixture is stirred until a substantially uniform dispersion has been obtained. Thereafter, 10.4 parts of $Mg(NO_3)_2.6H_2O$ is added and stirring is continued until the composition is substantially uniform.

After ten minutes' immersion in the aforementioned dispersion at 120° F., the staple is hydroextracted to contain a weight of solvent which is approximately equal to the weight of the undried staple. The treated staple is then dried for 2 hours at 150° F. When the dried, treated staple is stroked with metal, glass or plastic combs there is no evidence of the accumulation of static charges of electricity. In marked contrast, the untreated Dacron staple fibers, when similarly combed, balloon, flow apart and adhere to the comb.

EXAMPLE 6

Example 5 is repeated, but instead of using Dacron staple fibers there is used 30 parts of Orlon staple which is formed of a homopolymer of acrylonitrile. Substantially the same results are obtained.

EXAMPLE 7

Ten (10) parts of woolen flannnel are impregnated by immersion in the same liquid antistatic composition described in Example 5, after which the flannel is passed through squeeze rolls so adjusted as to give 100% wet-pickup. After drying the wet, impregnated flannel for ten minutes at 250° F., it is rubbed with a plastic rod. After rubbing, the flannel shows no evidence of accumulating electrostatic charges when tested by bringing carbon black particles in close proximity thereto. The untreated woolen flannel, on the other hand, shows the accumulation of charges of static electricity when similarly stroked and tested.

EXAMPLE 8

Example 7 is repeated but using (1) medium weight rayon suiting and (2) an acetate rayon fabric as the materials to which the antistatic composition is applied instead of woolen flannel. The results are substantially the same as those described in Example 7.

When a solution of magnesium nitrate alone is applied to an acetate rayon fabric, it stiffens the fabric considerably.

EXAMPLE 9

A liquid antistatic composition containing about 1.5% solids is prepared as follows:

To 588 parts of water at 120° F. is added 6 parts of the sodium bisulfite-addition product of the condensation product of glyceryl monostearate and polyethylene glycol 400 dimaleate (see Example 2). The mixture is stirred until a substantially uniform dispersion has been obtained, after which 3 parts of strontium chloride is added and stirring is continued until the composition is substantially uniform.

Thirty (30) parts of dry staple fiber (3 denier, 1½ inches in average length) formed of a copolymer of about 95% acrylonitrile and 5% methyl acrylate is immersed for 10 minutes in the 120° F. liquid antistatic composition. The wet, treated staple is squeezed by hand to a 200% wet-pickup, after which it is dried for 4 hours at 150° F. Static control as measured by combing or stroking tests, such as have been described hereinbefore, or by tumbling, is excellent. In marked contrast, the untreated staple rapidly accumulates and retains electrostatic charges when similarly tested.

Similar results are obtained when 3 parts of one of the following salts is substituted for 3 parts of strontium chloride in the above antistatic composition:

Aluminum chloride
Magnesium chloride
Strontium nitrate
Zinc chloride
Calcium chloride
Lithium fluoride These and other inorganic antistatic salts, including strontium chloride, or mixtures thereof, also may be used instead of magnesium nitrate in any of Examples 1 to 8 inclusive.

EXAMPLE 10

Liquid antistatic compositions each containing about 1.5% solids are prepared in exactly the same manner described in Example 9 with the exception that, instead of using 3 parts of strontium chloride, there is used in the individual composition 3 parts of calcium nitrate, lithium nitrate, aluminum nitrate, sodium nitrite and sodium chloride.

A swatch (10 parts) of fabric formed of cellulose acetate rayon is immersed in each dispersion of the antistatic composition at 120° F. for 1 minute, and is then passed through a pad-mangle adjusted to 100% wet-pickup. The impregnated fabrics are dried for 5 minutes at 250° F. No static effect occurs when the dried, treated fabrics are stroked with a glass, metal or plastic rod. In marked contrast the untreated fabrics accumulate static charges of electricity when similarly stroked.

EXAMPLE 11

This example illustrates the use of the antistatic compositions herein involved in the final rinse in dry-cleaning operations.

A swatch (10 parts) of fabric, square weave (40 x 46), that had been woven from staple fibers of a copolymer of acrylonitrile of the kind described more particularly in Example 1, is immersed in a solvent solution which is prepared as follows:

Four (4) parts of the sodium bisulfite-addition product of glyceryl monostearate and polyethylene glycol 400 dimaleate of the kind described in Example 2 and 4 parts of $Mg(NO_3)_2.6H_2O$ are dissolved in 50 parts of isopropanol. To the resulting solution is added 42 parts of perchloroethylene. The fabric is immersed in the solvent mix for 5 minutes and is then passed through squeeze rolls to remove the excess solvent. The treated fabric is then dried in a steam-heated oven at 140° F. for 4 hours. The dried fabric is free from static when subjected to stroking and combing tests of the kind described in the previous examples. On the other hand, the untreated fabric accumulates electrostatic charges when similarly tested.

EXAMPLE 12

Example 11 is repeated but using rayon challis, wool and viscose suiting as the fabrics which are subjected to the described treatment. In each case the dried, treated fabrics show no accumulation of static charges of electricity when tested by means of the aforedescribed stroking and combing tests.

EXAMPLE 13

A sample of polyacrylonitrile (homopolymeric acrylonitrile) having an average molecular weight of about 80,000 is dissolved in a 53% aqueous, neutral solution of calcium thiocyanate at about 45° C. under an atmosphere of carbon dioxide in the proportion of about 7 parts of polymer to about 93 parts of calcium thiocyanate solution. The solution of polyacrylonitrile is spun into a fiber by extruding it at about 70°–80° C. through a 40-hole spinneret having hole diameters of 110 microns into a spinning bath comprising water at about 1° C. The coagulated fiber is carried back and forth through the bath by means of a power-driven, submerged godet placed at one end of the bath and a set of free-running rollers at the other end. The total bath travel of the fiber is about 144 inches. On leaving the bath the yarn is subjected, during its travel, to a stretch of about 650% in a hot water bath maintained at 98°–99° C., and is finally collected on a bobbin rotating in a water spray to keep the yarn in gel state. A spool of the yarn in gel state is suspended in a liquid antistatic composition which is the same as that described in Example 2 with the exception that it has been further diluted with water to 1.5% solids content. This composition is maintained at 40°–50° C. during the treatment. The treated yarn is continuously passed over heated, converging drying rolls as is more fully described in, for instance, Cresswell et al. Patent No. 2,558,733. The dried yarn is immediately twisted and collected on a bobbin. The amount of "finish" on the treated yarn is found to be about 1% by weight of the dried, untreated yarn.

Yarn which has been treated in gel state with the above-described liquid antistatic composition is found to run cleaner on the drying rolls than the same gel yarn which has not been treated with an antistatic agent. Furthermore, the dried yarn is easier to handle, since the treatment eliminates filament ballooning caused by the building up of electrostatic charges on the filaments during processing.

EXAMPLE 14

Thirty (30) parts of dry staple fiber (3 denier, 1½ inches in average length) formed of a copolymer of about 95% acrylonitrile and 5% methyl acrylate is immersed in a liquid antistatic composition, more particularly an aqueous dispersion, containing about 2% solids and which is prepared as follows:

To 587 parts of water heated to 120° F. is added 3 parts of the sodium polysulfosuccinate of glycerol monostearate, which is produced as described in the aforementioned Thurston copending application Serial No. 188,485. The mixture is stirred until the solid is completely dispersed, after which 10.4 parts of $Mg(NO_3)_2.6H_2O$ is added and stirring is continued until a substantially uniform dispersion has been obtained.

After 10 minutes' immersion in the aforementioned dispersion at 120° F., the staple is hydroextracted to contain a weight of solvent which is approximately equal to the weight of the undried staple. The treated staple is then dried for 2 hours at 150° F. It is found to be impossible to build up an electrostatic charge on the dried, treated staple by combing, stroking, tumbling or rubbing tests, such as have been described hereinbefore, whereas the untreated staple shows severe static accumulations under the same tests.

EXAMPLE 15

A liquid antistatic composition is prepared in exactly the same manner described under Example 14 with the exception that 3 parts of gamma-stearamidopropyl dimethyl beta-hydroxyethyl ammonium chloride is used instead of 3 parts of the sodium polysulfosuccinate of glyceryl monostearate.

A staple fiber of the same kind described in Example 14, with the exception that it is 3 denier, 2½ inches in average length, is treated in the same manner described in that example. When the treated staple is stroked with metal, glass or plastic combs there is no evidence of the accumulation of static charges of electricity, whereas the untreated staple rapidly picks up and retains electrostatic charges when subjected to these same tests.

Similar results are obtained when gamma-stearamidopropyl dimethyl beta-hydroxyethyl ammonium phosphate is substituted for the corresponding chloride in making the antistatic composition.

EXAMPLE 16

Exactly the same procedure is followed as described under Example 9 with the exception that, in preparing the antistatic composition, there is used 6 parts of diamyl sodium sulfosuccinate instead of the bisulfite-addition product employed in that example as the crystal growth-inhibiting agent. The dried, treated staple shows no accumulation of electrostatic charges when tested in the same manner described in the prior examples, but is harsh (not soft) to the hand.

Substantially the same results are obtained with a number of other crystal growth-inhibiting agents, specifically dihexyl sodium sulfosuccinate and symmetrical bis(sodium sulfonaphthyl)methane. When the matter of softness is not of primary consideration, such agents can be used in the antistatic compositions employed in practicing the present invention.

The preferred inorganic salts used in producing the antistatic compositions herein involved are those water-soluble inorganic salts, the polarizability of the cation of which is not more than $12 \times 10^{-25}$ cc. Examples of such salts are:

Magnesium nitrate
Magnesium chloride
Magnesium chromate (used under acid conditions, e. g., a pH of about 4.0)
Magnesium acid phosphate (used under acid conditions, e. g., a pH of about 4.0)
Strontium nitrate
Strontium chloride
Aluminum nitrate
Aluminum chloride
Calcium nitrate
Zinc chloride
Calcium chloride
Sodium chloride
Sodium nitrite
Lithium nitrate
Lithium fluoride In connection with the polarizability of the cation of the preferred salts mentioned above, attention is directed to the following definition of polarizability of an ion and brief discussion of the same:

The polarizability of an ion properly may be described as its ability to adjust its electron distribution to the electrical forcefields of its environment; or, it also may be defined as a measure of the deformability of the electron cloud of an ion induced by an electromagnetic forcefield. A surface has a symmetrical forcefield. When a highly polarizable cation is adsorbed on a surface, the electron distribution of the cation becomes asymmetrical. For instance, the electron distribution of a lead cation adsorbed on soft glass is so changed that electrons are repelled from the surface. This makes the ultimate surface resemble that of metallic lead. The surface is hydrophobic. Ions of low polarizability are not sensitive to the asymmetrical forcefield, do not develop an asymmetrical electron distribution and, therefore, do not inhibit the surface forces from attracting water molecules. The polarizabilities of some of the component ions of salts can be found in Landolt-Börnstein, 6th ed., vol. I, part 1, page 401, published in 1950 by Springer-Verlag (Berlin). Other polarizabilities not given in this publication can be estimated from the atomic refractions wihch are given in this publication. It will be clear from the data and other information given in this publication, and from the foregoing brief discussion, as to the meaning of the expression appearing herein that limits the antistatic inorganic salt ingredient of the composition to those wherein the polarizability of the cation component thereof is not more than $12 \times 10^{-25}$ cc.

The inorganic salts used in producing the antistatic compositions herein involved are those soluble inorganic salts which function as antistatic agents for the base material which is treated with the antistatic composition and which normally are deposited in the form of relatively large crystals (e. g., from 10 to 15 microns, and larger, in average particle size) upon volatilization of the solvent in which the particular salt is dissolved, e. g., water. The crystal growth-inhibiting agents employed in producing the antistatic compositions herein involved are capable of either preventing the deposition of such crystals completely or of controlling or modifying the crystal deposition or formation so that perceptible crystals having a maximum average particle size of about 5 microns are present in the composition. As has been indicated hereinbefore, particles of this size are near the lower limit of the resolving power of light microscopes.

It will be understood, of course, by those skilled in the art that my invention is not limited to the use of the specific antistatic compositions described in the above illustrative examples or in the particular manner and to the particular base materials described by way of illustration in these examples, since other compositions of the kind set forth in the portion of this specification prior to and after the examples can be employed in treating textile and other materials or articles which, in a dry state, normally accumulate or tend to accumulate static charges of electricity. Thus, instead of the particular crystal growth inhibiting agent employed in the individual examples, I may use any other such product which coacts with the antistatic inorganic salt in the manner hereinbefore described and, preferably, one which also has a softening and/or lubricating effect on the material undergoing treatment. Likewise, antistatic inorganic salts other than those employed in the various examples and mentioned elsewhere herein can be used in the antistatic compositions employed in practicing the present invention.

The antistatic compositions used in carrying my invention into effect are effective not only in improving the useful properties of textiles fibers and fabrics which, in a dry state, normally accumulate (or tend to accumulate) static charges of electricity, but also various other shaped or formed articles, e. g., phonograph records made of vinyl resins, vinyl and other plastic materials in sheet or film form, photographic-film base materials formed of cellulose ester or other material that tends to accumulate an electrostatic charge, etc.

I claim:

1. The method of conditioning a material which, in a dry state, normally tends to accumulate static charges of electricity thereon, said method comprising applying to said material a liquid treating composition comprising (1) an antistatic agent which is a soluble inorganic salt that normally is deposited in the form of relatively large crystals upon volatilization of the solvent in which it is dissolved, and (2) a crystal growth-inhibiting agent in an amount, with respect to the said antistatic agent, that is sufficient to inhibit the deposition of said crystals, the ingredients of (1) and (2) being dispersed in a volatile liquid; and drying the thusly treated material to volatilize the said liquid, the amount of the said liquid treating composition which is applied to the said material being such that the total amount of the ingredients of (1) and (2) held by the treated material is from about 0.2% to about 10% of the weight of the dried, untreated material.

2. A method as in claim 1 wherein the crystal growth-inhibiting agent is a salt which is an addition product of (1) a bisulfite and (2) a polyester which is a condensation product of (A) a glycerol ester selected from the class consisting of fatty acid monoglycerides, fatty acid diglycerides and mixtures thereof, wherein the fatty acid component thereof contains at least 8 carbon atoms, with (B) an esterification product of (a) an aliphatic dihydroxy compound selected from the class consisting of alkylene glycols and polyoxyalkylene glycols and (b) an ethylenically unsaturated dicarboxylic compound selected from the class consisting of ethylenically unsaturated dicarboxylic acids and anhydrides thereof, the ethylenically unsaturated grouping of the said dicarboxylic compound being alpha to a carbonyl group, the reactants of (A) and (B) being employed in a molar ratio of about 2 moles of the former to 1 mole of the latter, and the reactants of (a) and (b) being employed in a molar ratio of 1 mole of the former to about 2 moles of the latter.

3. A method as in claim 2 wherein the polyester of (2) is a condensation product of (A) a glyceryl ester comprising glyceryl monostearate and (B) a polyethylene glycol dimaleate comprising mainly nonaethylene glycol dimaleate, the reactants of (A) and (B) being employed in a molar ratio of about 2 moles of the former to 1 mole of the latter.

4. A method as in claim 1 wherein the material to which the defined treating composition is applied is a shaped article comprising a vinyl resin.

5. A method as in claim 4 wherein the shaped article includes fibers formed of a thermoplastic vinyl resin comprising a polymer of acrylonitrile.

6. The method of conditioning an article which, in a dry state, normally tends to accumulate static charges of electricity thereon, said method comprising applying to said article an aqueous treating composition comprising (1) an antistatic agent which is a water-soluble inorganic salt that normally is deposited in the form of relatively large crystals upon volatilization of the solvent in which it is dissolved, the polarizability of the cation of said salt being not more than $12 \times 10^{-25}$ cc., and (2) a crystal growth-inhibiting agent for inhibiting the deposition of the aforesaid crystals, the ingredients of (1) and (2) being dispersed in water and being present in the said treating composition in weight percentages of from about 5 to 97% of the former to from about 95 to 3% of the latter; and drying the thusly treated article, the amount of the said treating composition which is applied to the said article being such that the total amount of the ingredients of (1) and (2) held by the treated article is from about 0.2% to about 10% of the weight of the dried, untreated article.

7. A method as in claim 6 wherein magnesium nitrate is the water-soluble inorganic salt which constitutes the antistatic agent of (1), the crystal growth-inhibiting agent of (2) is a salt which is an addition product of (I) a water-soluble bisulfite of an inorganic base and (II) a polyester which is a condensation product of (A) a glyceryl ester comprising glyceryl monostearate and (B) a polyethylene glycol dimaleate comprising mainly nonaethylene glycol dimaleate, the reactants of (A) and (B) being employed in a molar ratio of about 2 moles of the former to 1 mole of the latter, and the article which is treated with the defined aqueous treating composition is a textile comprising fibers formed of an acrylonitrile polymerization product containing a preponderant preportion by weight of combined acrylonitrile.

8. The method which comprises applying a liquid treating composition to a fiber in gel state and in which the solid phase comprises an acrylonitrile polymerization product containing in the molecules thereof an average of at least about 80% by weight of combined acrylonitrile, said treating composition comprising an aqueous dispersion containing (1) an antistatic agent which is a water-soluble inorganic salt that normally is deposited in the form of relatively large crystals upon volatilization of the solvent in which it is dissolved, and (2) a crystal growth-inhibiting agent in an amount, with respect to the said antistatic agent, that is sufficient to inhibit the deposition of said crystals; and drying the thusly treated, gelled fiber, the said treating composition imparting antistatic characteristics to the said fiber during and after drying thereof, and the amount of the said composition which is applied to the said gelled fiber being such that the total amount of the ingredients of (1) and (2) held by the treated fiber is from about 0.2% to about 10% of the weight of the dried, untreated fiber.

9. An article which, in a dry state, normally has a tendency to accumulate static charges of electricity thereon, said article having deposited at least on outer surfaces thereof an antistatic composition comprising (1) an antistatic agent which is a soluble inorganic salt that normally is deposited in the form of relatively large crystals upon volatilization of the solvent in which it is dissolved, and (2) a crystal growth-inhibiting agent in an amount, with respect to the said antistatic agent, that is sufficient to inhibit the deposition of said crystals, and the total amount of the ingredients of (1) and (2) that is held by the treated article being from about 0.2% to about 10% of the weight of the dried, untreated article.

10. An article comprising a vinyl resin and which, in a dry state, normally has a tendency to accumulate static charges of electricity thereon, said article having deposited at least on outer surfaces thereof an antistatic composition compriisng (1) an antistatic agent which is a water-soluble inorganic salt that normally is deposited in the form of relatively large crystals upon volatilization of the solvent in which it is dissolved, the polarizability of the cation of said salt being not more than $12 \times 10^{-25}$ cc., and (2) a crystal growth-inhibiting agent for inhibiting the deposition of the aforesaid crystals, the ingredients of (1) and (2) being present in the said antistatic composition in weight percentages of from about 5 to 97% of the former to from about 95 to 3% of the latter, and the total amount of the ingredients of (1) and (2) that is held by the treated article being from about 0.2% to about 10% of the weight of the dried, untreated article.

11. A textile formed of fibers including fibers of a thermoplastic product of polymerization of polymerizable vinyl compound including acrylonitrile, said textile in a dry state normally having a tendency to accumulate static charges of electricity thereon and, to lessen this tendency, having been treated with an antistatic composition comprising (I) magnesium nitrate and (II) a salt which is an additional product of (1) a bisulfite and (2) a polyester which is a condensation product of (A) a glycerol ester selected from the class consisting of fatty acid monoglycerides, fatty acid diglycerides and mixtures thereof, wherein the fatty acid component contains at least 8 carbon atoms, with (B) an esterification product of (a) an aliphatic dihydroxy compound selected from the class consisting of alkylene glycols and polyoxyalkylene glycols and (b) an ethylenically unsaturated dicarboxylic compound selected from the class consisting of ethylenically unsaturated dicarboxylic acids and anhydrides thereof, the ethylenically unsaturated grouping of the said dicarboxylic compound being alpha to a carbonyl group, the reactants of (A) and (B) being employed in a molar ratio of about 2 moles of the former to 1 mole of the latter, and the reactants of (a) and (b) being employed in a molar ratio of 1 mole of the former to about 2 moles of the latter, the ingredients of (I) and (II) being present in the said antistatic composition in weight percentages of from about 5 to 97% of the former to from about 95 to 3% of the latter, and the total amount of the ingredients of (I) and (II) that is held by the treated textile being from about 0.2% to about 10% of the weight of the dried, untreated textile.

12. Textile fibers including fibers formed of an acrylonitrile polymerization product containing in the molecules thereof an average of at least about 80% by weight of combined acrylonitrile, said fibers having deposited at least on outer surfaces thereof an antistatic composition comprising (I) magnesium nitrate and (II) a salt which is an addition product of (1) a water-soluble bisulfite and (2) a polyester which is a condensation product of (A) a glyceryl ester comprising glyceryl monostearate and (B) a polyethylene glycol dimaleate comprising mainly nonaethylene glycol dimaleate, the reactants of (A) and (B) being employed in a molar ratio of about 2 moles of the former to 1 mole of the latter, the ingredients of (I) and (II) being present in the said antistatic composition in weight percentages of from about 5 to 97% of the former to from about 95 to 3% of the latter, and the total amount of the ingredients of (I) and (II) that is held by the treated textile fibers being from about 0.2% to about 10% of the weight of the dried, untreated fibers.

References Cited in the file of this patent

UNITED STATES PATENTS

| | | |
|---|---|---|
| 2,086,544 | Dreyfus | July 13, 1937 |
| 2,328,600 | Baggett | Sept. 7, 1943 |
| 2,562,155 | Vitalis | July 24, 1951 |
| 2,609,350 | Spatt | Sept. 2, 1952 |